United States Patent
Dannebey et al.

(10) Patent No.: US 7,563,089 B2
(45) Date of Patent: Jul. 21, 2009

(54) HEIGHT-ADJUSTABLE MOLDING DEVICE FOR MOLDING THERMOPLASTIC RECIPIENTS OF VARIOUS HEIGHTS

(75) Inventors: Laurent Dannebey, Octeville-sur-Mer (FR); Eric Canchel, Octeville-sur-Mer (FR); Philippe Pitte, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 81 days.

(21) Appl. No.: 11/887,905

(22) PCT Filed: Mar. 28, 2006

(86) PCT No.: PCT/FR2006/000668

§ 371 (c)(1),
(2), (4) Date: Nov. 12, 2007

(87) PCT Pub. No.: WO2006/106209

PCT Pub. Date: Oct. 12, 2006

(65) Prior Publication Data

US 2009/0028976 A1 Jan. 29, 2009

(30) Foreign Application Priority Data

Apr. 4, 2005 (FR) .................................. 05 03305

(51) Int. Cl.
*B29C 49/48* (2006.01)

(52) U.S. Cl. ........................ 425/195; 249/102; 249/155; 425/522

(58) Field of Classification Search ............. 425/192 R, 425/195, 522; 249/102, 155
See application file for complete search history.

(56) References Cited

U.S. PATENT DOCUMENTS

| | | | | |
|---|---|---|---|---|
| 4,815,960 | A | * | 3/1989 | Rudolph ..................... 425/522 |
| 5,255,889 | A | * | 10/1993 | Collette et al. .............. 249/102 |
| 5,968,560 | A | | 10/1999 | Briere et al. |
| 6,113,377 | A | * | 9/2000 | Clark ........................ 425/195 |
| 6,428,302 | B1 | * | 8/2002 | Tsau ...................... 425/192 R |
| 7,258,538 | B2 | * | 8/2007 | Miller ....................... 425/182 |
| 2004/0013762 | A1 | | 1/2004 | Bianchini | |

FOREIGN PATENT DOCUMENTS

GB 1 425 638 A 2/1976

\* cited by examiner

*Primary Examiner*—Robert B Davis
(74) *Attorney, Agent, or Firm*—Sughrue Mion, PLLC

(57) ABSTRACT

The invention relates to a molding device for blowing thermoplastic recipients of various heights, said device comprising a mould provided with two mould halves and a mould bottom which are mutually mobile. Each mould half comprises a mould carrier, a chill carrier and a chill, said two chills and the mould bottom comprising mould impressions, which together define a molding cavity. The inventive device also comprises means for compensating the blowing pressure, said means being provided between a mould carrier and the associated chill carrier. For recipients with the maximum height, the chill carriers and chills are the same height. For lower recipients, the chills are lower than the chill carriers and radially reinforcing means are provided on the internal faces of the carriers in the parts thereof which do not co-operate with the chills.

7 Claims, 5 Drawing Sheets

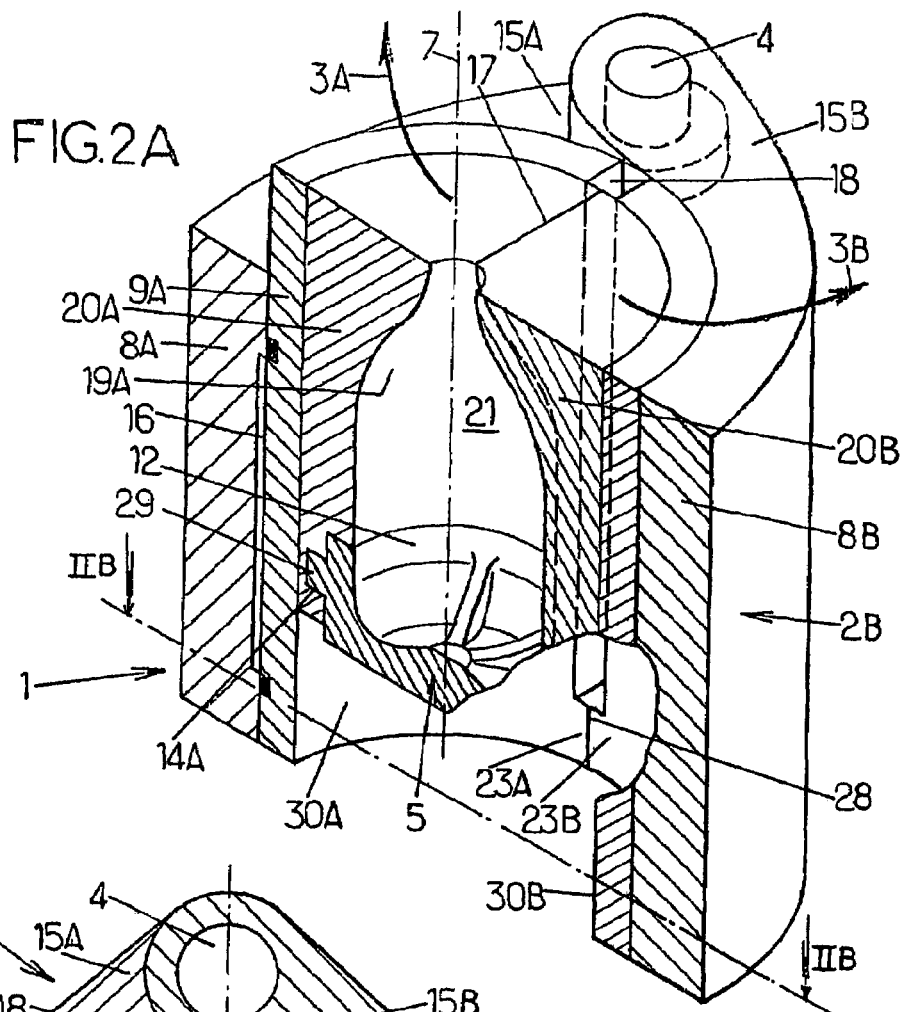
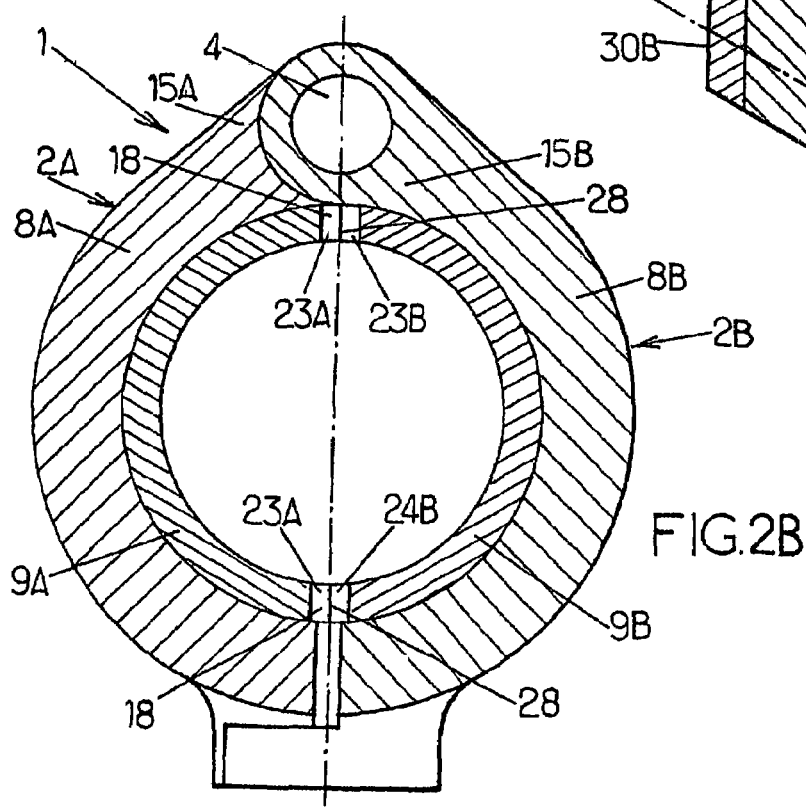

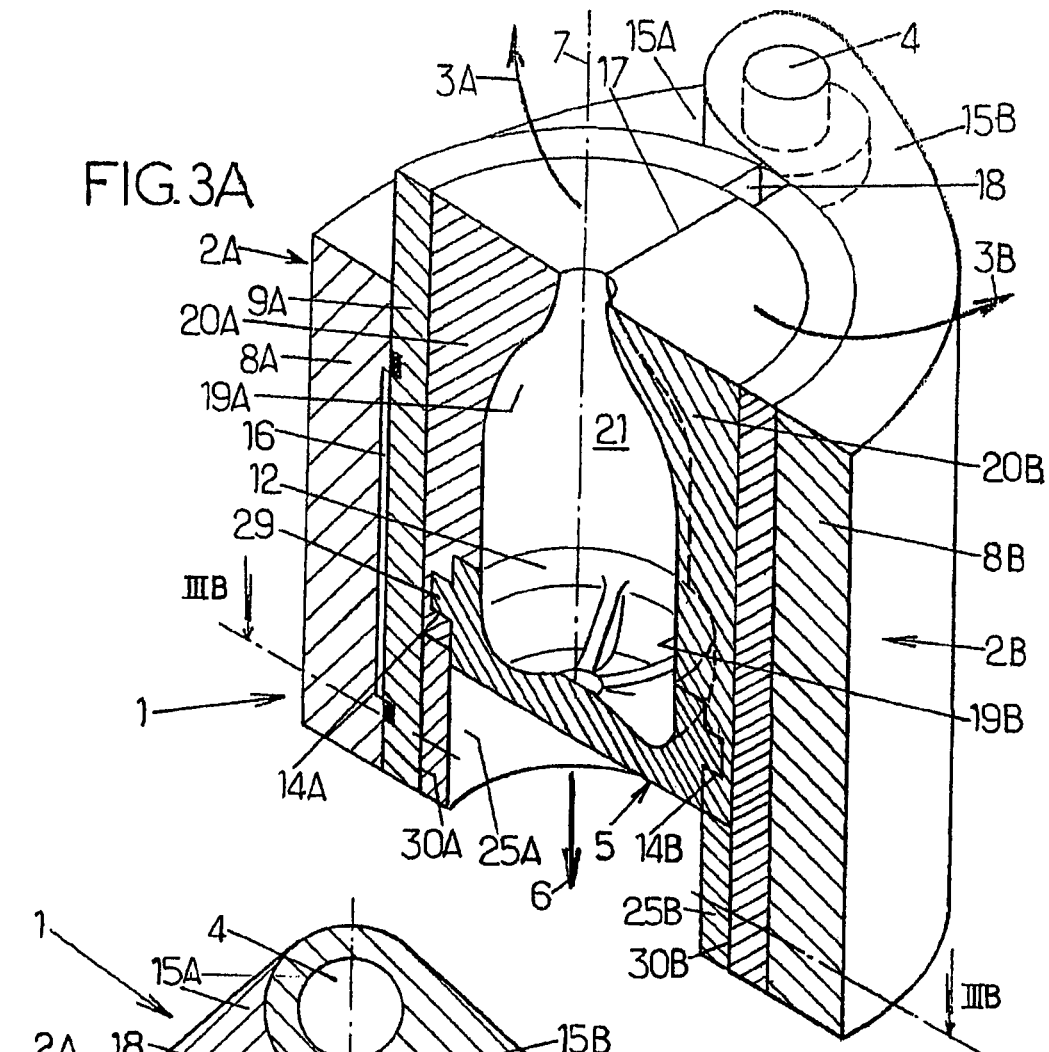
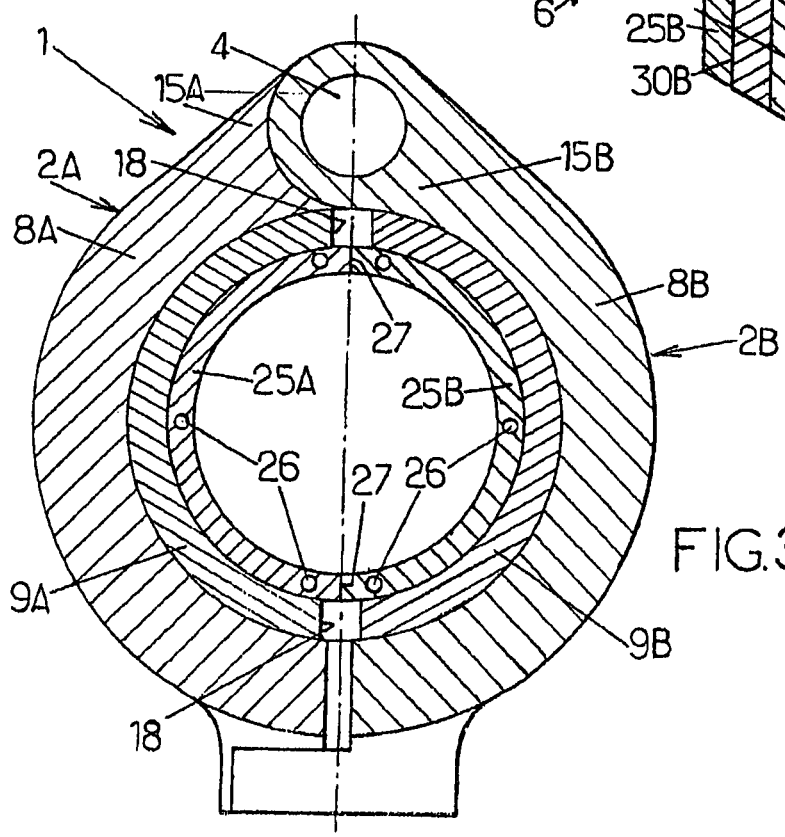

HEIGHT-ADJUSTABLE MOLDING DEVICE FOR MOLDING THERMOPLASTIC RECIPIENTS OF VARIOUS HEIGHTS

FIELD OF THE INVENTION

The present invention relates in general to the field of molding devices for manufacturing containers, particularly bottles, made of thermoplastic, such as PET, by blow-molding or stretch-blow-molding and it relates more particularly to improvements made to those of these molding devices that are designed to manufacture such containers, particularly such bottles, which are liable to have different heights, said molding devices comprising at least one mold which comprises two mold halves able to move relative to one another, for example in rotation about a fixed common axle, and a mold base able to move relative to the two mold halves in axial translation, each mold half comprising a mold holder, a shell holder fixed to the mold holder and a shell supported by the shell holder, the two shells and the mold base comprising respective molding cavity portions which, when the mold is in the closed position, together define a molding cavity, means for compensating for the blowing pressure being provided between a mold holder and the respective shell holder.

BACKGROUND OF THE INVENTION

FIG. 1A schematically illustrates, in axial half section and in lateral perspective from above, a mold, denoted in its entirety by the reference 1, of a molding device at which the invention is aimed. The mold 1, having a longitudinal axis 7, comprises two mold halves 2A, 2B respectively, able to move one relative to the other, particularly in rotation (arrows 3A, 3B respectively) about a fixed common axle 4, and a mold base 5 which can move with respect to the two mold halves 2A, 2B in axial translation, as illustrated by the arrow 6, coaxial to the longitudinal axis 7 of the mold.

Each mold half 2A, 2B comprises a mold holder 8A, 8B respectively, which is equipped with respective support arms 15A, 15B articulated to said axle 4, a respective shell holder 9A, 9B, fixed to the corresponding mold holder in any way known to those skilled in the art and a respective shell 10A, 10B supported by the respective shell holder 9A, 9B in any way known to those skilled in the art. The two shells 10A, 10B and the mold base 5 comprise respective molding cavity portions 11A, 11B and 12 which, when the mold is in the closed position, together define a molding cavity 13 which is coaxial with the longitudinal axis 7 of the mold 1. A structure of this type is described and depicted for example in document FR-2 733 176.

Along the cooperating respective peripherals of the shells 10A, 10B and of the base 5, the shells are equipped with respective grooves 14A, 14B and the base is equipped with a radially projecting peripheral rib 29 able to be housed in the grooves 14A, 14B when the mold 1 is in the closed position as illustrated in FIG. 1A, so that the shells and the base form a mechanical assembly that is non-deformable in the presence of the blowing pressure (of the order of $40 \times 10^5$ Pa). Arrangements of this type are represented, for example, in documents FR-2 720 680, FR-2 828 829 and FR-2 841 495.

Finally, means 16 for compensating for the blow-molding pressure are provided between one of the mold holders 8A, for example, and the corresponding shell holder 9A, these pressure-compensating means 16 possibly in particular comprising a chamber between the mold holder 8A and the shell holder 9A as shown in FIG. 1A, it being possible for the chamber to be supplied with blow-molding fluid, during the blow-molding, by means that are not visible in FIG. 1A. An arrangement of this type may be found, for example, in document FR-2 659 265.

It will be noted that, in the depiction of FIG. 1A, the plane of section of the closed mold 1 is substantially diametral and substantially perpendicular to the parting line 17 of the shells 10A, 10B. It will also be noted that the shell holders 9A, 9B are slightly shorter around the periphery than the shells which means that, when the mold 1 is closed, there remains a gap 18 between their facing respective longitudinal edges so as to ensure that the shells bear correctly against one another along the parting line 17.

In the configuration illustrated in FIG. 1A, the shells 10A, 10B have a height substantially equal to that of the respective shell holders 9A, 9B, which is the height of the mold 1. Thus, the molding cavity 13 has the maximum permissible height for this mold and corresponds to the maximum height of the containers that can be manufactured using this mold.

In order to improve the production capability of the mold, it is desirable for it to be able to be configured for manufacturing not only said maximum-height containers, but also for manufacturing containers of lesser heights. To these ends, it is known practice for the shells 10A, 10B equipped with the respective molding cavity portions 11A, 11B, to be replaced by shells 20A, 20B equipped with different molding cavity portions 19A, 19B, (in this instance, molding cavity portions that are not as tall) as shown in FIG. 1B. In practice, the shells 20A, 20B are positioned at the top of the shell holders so that their respective upper faces remain at the same level as the respective upper faces of the shell holders so that there is no need to alter the layout of the other functional elements needed for blow-molding or stretch-blow-molding the container. The cavity portions 19A and 19B and the cavity portion 12 in the base together, when the mold is in the closed position, define a molding cavity 21 that is not as tall as the molding cavity 13 of FIG. 1A. Thus the overall arrangement of the molding device is maintained, with the mold holders 8A, 8B and the shell holders 9A, 9B, and the base 5 the axial position of which needs to be modified in relation to the reduction in height of the molding cavity portions.

In this known solution, the shells 20A, 20B equipped with the shorter-height molding cavity portions 19A, 19B maintain the same height as the shells 10A, 10B of FIG. 1A. In this case, the lower parts 22A, 22B of the shells 20A, 20B, situated below the base 5—that is to say below the grooves 14A, 14B respectively—are in the form of simple semi-cylindrical walls of revolution as is clearly visible in FIG. 1B. These lower parts 22A, 22B thus constitute integral parts of the respective shells 20A, 20B to which they belong and are of one piece with the upper parts of the shells that comprise the respective cavity portions 19A, 19B respectively.

The advantage of the conventional structure that has just been explained lies in the fact that, when the mold is in the closed position, the two shells 20A, 20B bear against one another along the parting line 17, even in the bottom of the mold. In other words, the two lower parts 22A, 22B together form a cylindrical annular support of revolution against which the two shell holders 9A, 9B respectively can bear when the chamber that forms part of the pressure-compensating means 16 is subjected to the blow-molding pressure. An annular support such as this thus opposes radial deformation, towards the center, of the lower part of the shell holder 9A to which the blow-molding pressure is applied.

However, this known structure does at the same time have the appreciable disadvantage that the shells 20A, 20B are machined from solid, which, when machining the lower parts 22A, 22B, entails removing a significant volume of material. This results in waste materials, machining time, and therefore results in height costs.

SUMMARY OF THE INVENTION

It is an essential object of the invention to propose an improved technical solution that is more economical both in terms of material and in terms of machining time but which does, however, preserve the freedom to adapt the useful height of the shells to suit the actual height of the containers that are to be manufactured.

To these ends, the invention proposes a molding device for manufacturing containers, particularly bottles, by blow-molding or stretch-blow-molding a thermoplastic, such as PET and which are liable to have different heights, arranged as mentioned in the preamble, which device, being a device according to the invention, is characterized by the following combination of features:

- to manufacture containers of the tallest height (maximum height), the shell holders and shells have substantially identical respective heights,
- to manufacture containers of heights shorter than said maximum height, the shells have a height shorter than that of the respective shell holders and reinforcing means are provided on the respective internal faces of the shell holders in those parts thereof that are not cooperating with the respective shells, said reinforcing means being able radially to reinforce those parts of the shell holders that are not cooperating with the respective shells when the pressure-compensating means are active.

By virtue of these arrangements, the two shell holders still have a radial support in those parts thereof that are not cooperating with the respective shells, but at the same time, the shells themselves can therefore be manufactured with a shorter height in relation to the actual height of the containers that are to be manufactured.

As for the reinforcing means, these can be produced economically as revealed later on with reference to two concrete examples.

In practice, the simplest solution, having regard to the conventional layout of molding devices, is for the shells to be supported by the respective shell holders in such a way that their respective upper edges are aligned with one another, for, when manufacturing containers of heights shorter than said maximum height, those parts of the shell holders that are not cooperating with the respective shells to be lower parts of the shell holders, and for the reinforcing means to be located in said lower parts of the shell holders.

A first exemplary embodiment may consist in the reinforcing means comprising, on each shell holder, at least two strips projecting from the respective longitudinal edges of the shell holder substantially as a continuation of the shape of the shell holder and covering a distance along the perimeter that is such that when the molding is in the closed position, the frontal surfaces of the strips belonging to the respective shell holders bear against one another just as do the shells. Advantageously, in this case, the strips are located at the lower end or in close proximity to the lower end of the respective shell holders.

An alternative form of embodiment may consist in the shell holders having respective ribs which project radially inwards and extend around the entire perimeter of the shell holders, along the lower edge or in close proximity to the lower edge thereof, even facing the strips.

A second exemplary embodiment, which is, in practice, preferred on account of the simplicity with which the constituent parts can be manufactured, is for the reinforcing means to comprise two semi-tubular portions which are situated on the respective shell holders at the positions left unoccupied by the shorter shell holders; these two semi-tubular portions have a height substantially equal to the difference in respective heights of the shell holders and the shells and their respective longitudinal frontal surfaces bear against one another just as do the shells, when the mold is in the closed position. In the aforementioned preferred embodiment, the semi-tubular portions are positioned in the lower parts of the respective shell holders. Advantageously, the semi-tubular portions are mechanically secured to the respective shells in such a way as to form one-piece entities that are quicker and easier to fit or to remove and, to these ends, provision is made for the semi-tubular portions to have, passing through their wall, longitudinal bores able to accept members for screwing them to the respective shells. In the context of this preferred arrangement, the semi-tubular portions may be manufactured economically from portions of tube of suitable diameter and thickness, with a smaller amount of machining and without loss of material.

BRIEF DESCRIPTION OF THE DRAWINGS

The invention will be better understood from reading the detailed description which follows of certain preferred embodiments which are given solely by way of purely illustrative examples. In this description, reference is made to the attached drawings in which:

FIG. 2A is a schematic view, in diametral section with partial cut-away and in lateral perspective from above, similar to the view of FIG. 1B, of a first exemplary embodiment of a mold arranged according to the invention;

FIG. 2B is a view from above, in section on IIB-IIB of FIG. 2A, of the mold of FIG. 2A;

FIG. 3A is a schematic view, in diametral section and in lateral perspective from above, similar to the view of FIG. 1B, of a second embodiment, which is a preferred embodiment, of a mold according to the invention; and FIG. 3B is a view from above, in section on IIIB-IIIB of FIG. 3A, of the mold of FIG. 3A.

DETAILED DESCRIPTION OF THE INVENTION

Figure 1A:
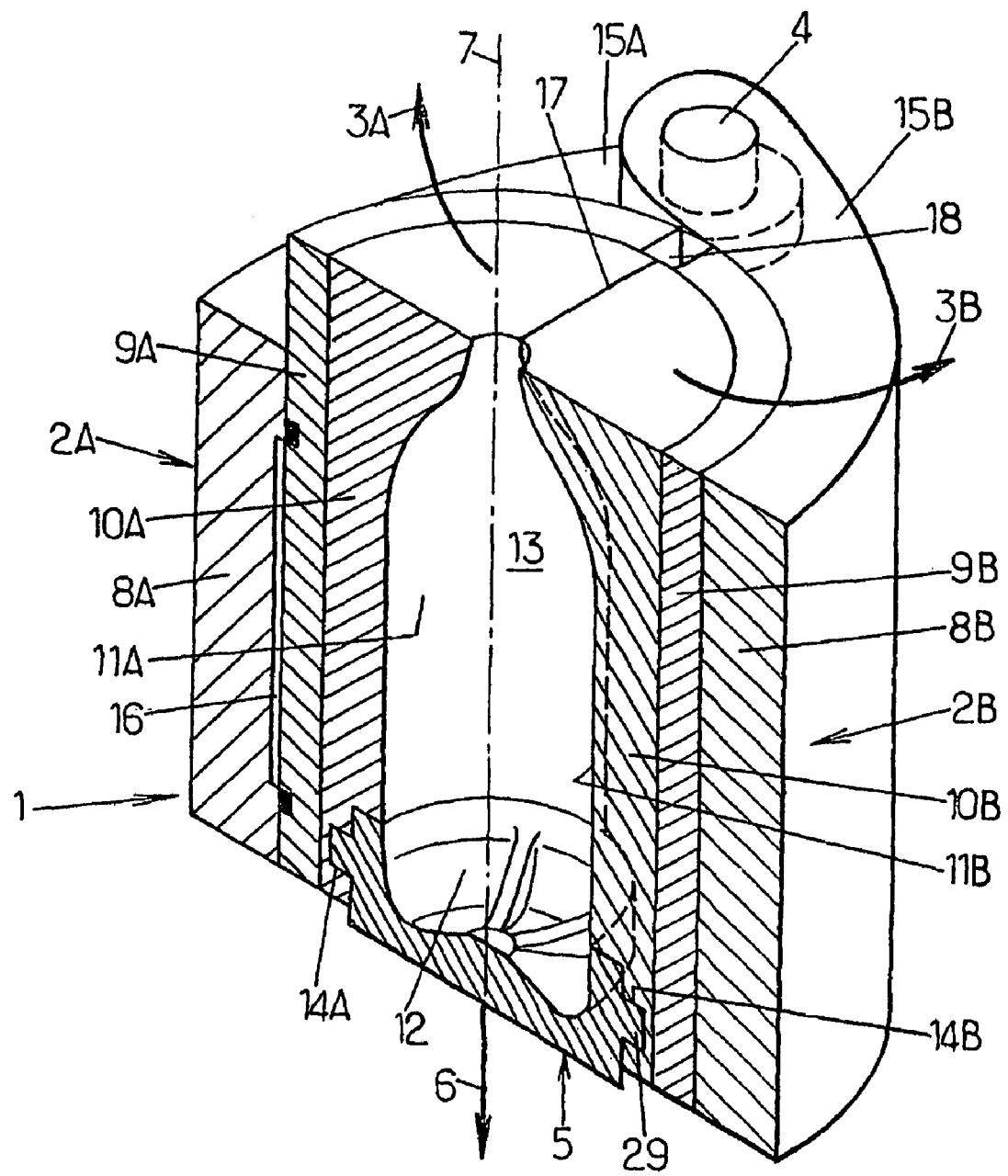
FIGS. 1A and 1B schematically illustrate, in axial half section and in lateral perspective from above, a mold of the prior art shown respectively in two use arrangements for manufactures of containers having two different heights.
Figure 1B:
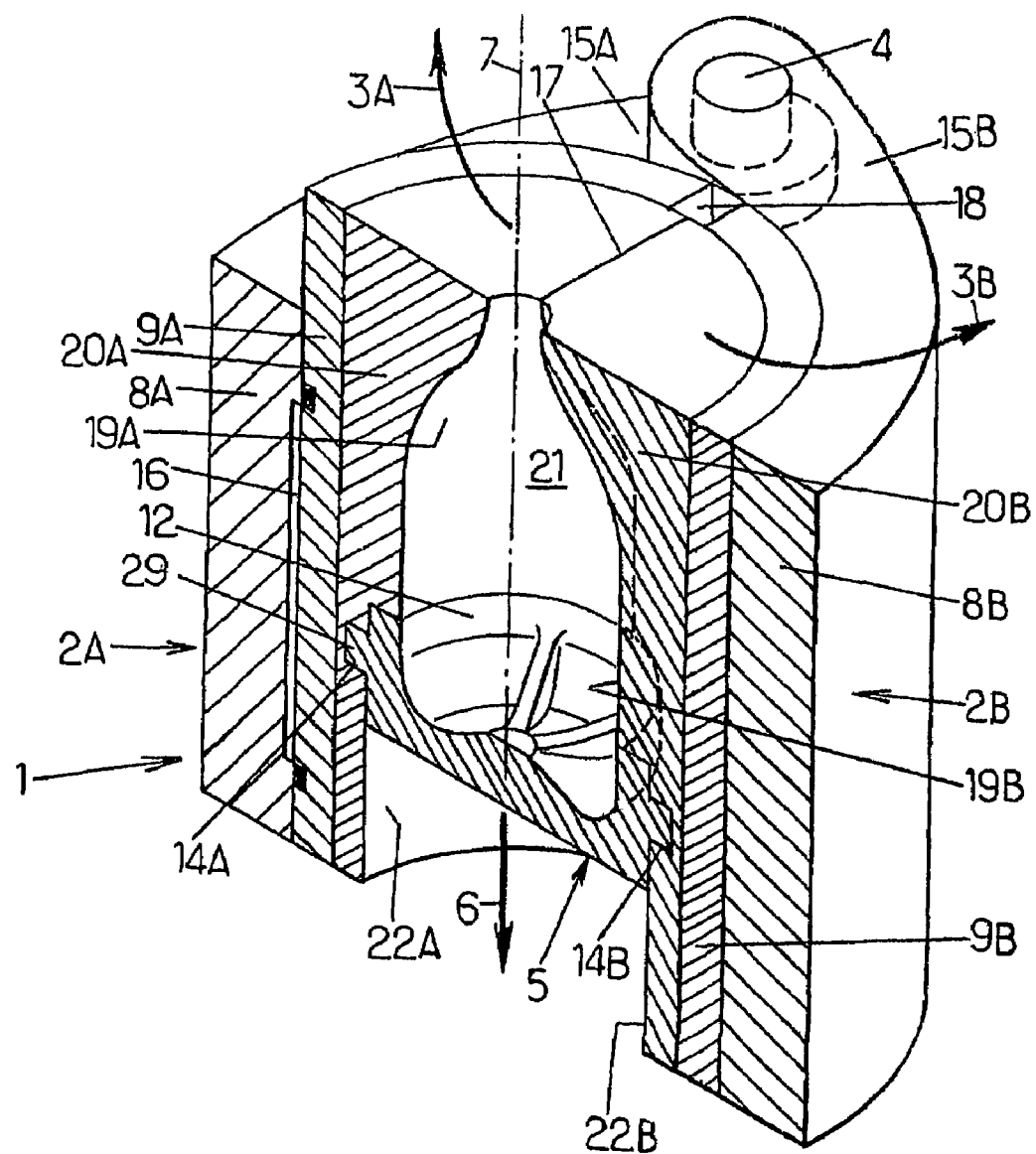

In the remainder of the description, the same numerical references as were used in FIG. 1B will be kept for denoting parts that are similar.

Figure 2C:
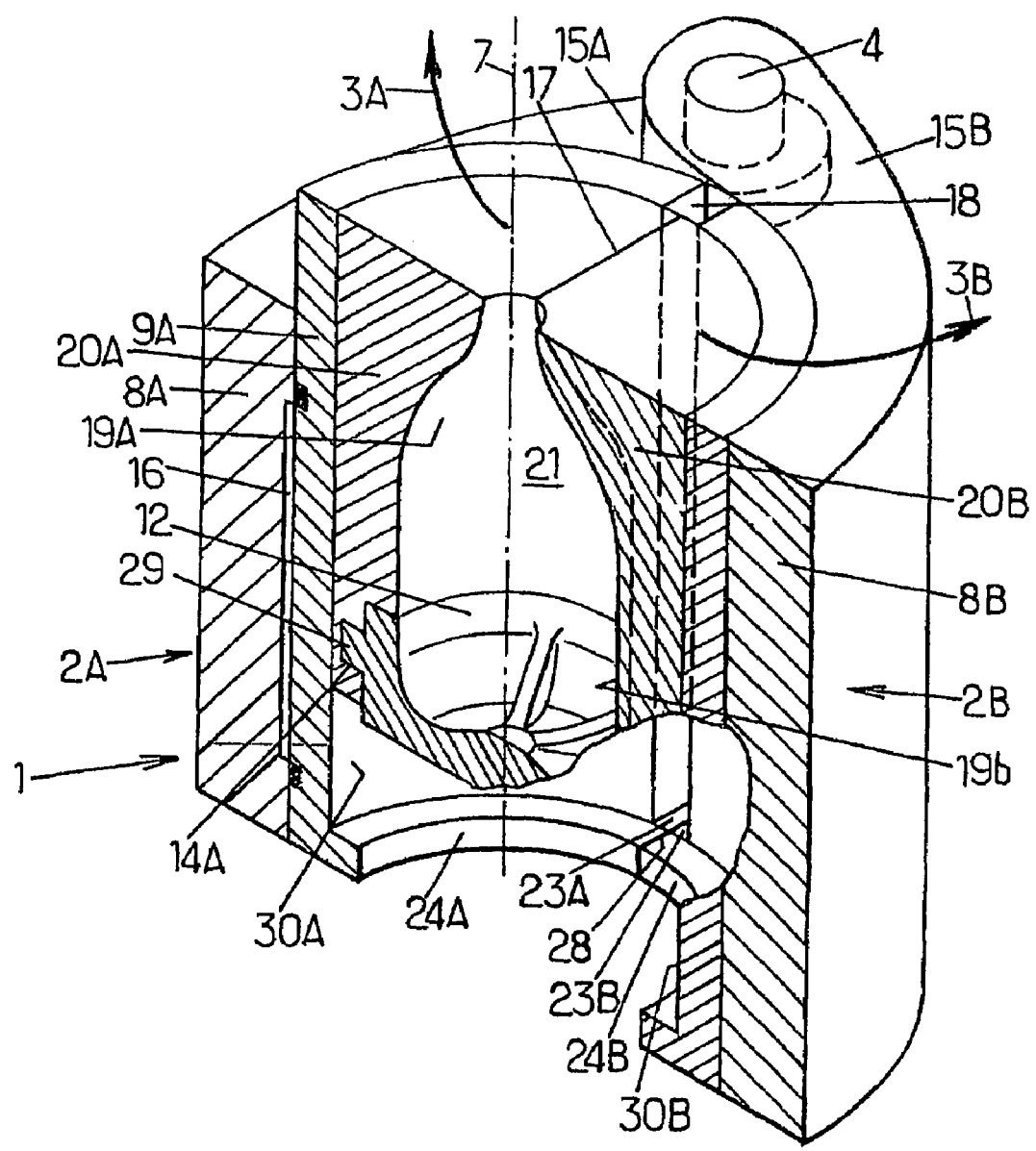
FIG. 2C is a schematic view, in diametral section with partial cut away and in lateral perspective from above, similar to FIG. 2A, of an alternative form of embodiment of the mold of FIGS. 2A and 2B.

According to the invention, the following combination of arrangements is provided:

- to manufacture containers of the tallest height (maximum height), the shell holders 9A, 9B and shells 10A, 10B have substantially identical respective heights, as shown in FIG. 1A;
- to manufacture containers of heights shorter than said maximum height, the shells 20A, 20B have a height shorter than that of the respective shell holders 9A, 9B, as visible in FIGS. 2A, 2C and 3A, and reinforcing means are provided on the respective internal faces of the shell holders 9A, 9B in those parts 30A, 30B thereof that are not cooperating with the respective shells 20A, 20B, said reinforcing means being able radially to reinforce those parts 30A, 30B of the shell holders that are not cooperating with the respective shells 20A, 20B when the pressure-compensating means are active.

There are various conceivable technical solutions for forming said reinforcing means. A number of examples will now be explained more specifically in the context, more likely to be employed in practice, in which the shorter shells are positioned towards the top of the respective shell holders so that their respective upper edges are substantially aligned with one another and those parts 30A, 30B of the shell holders that are not cooperating with the shells are situated towards the bottom.

Reference is now made more specifically to FIGS. 2A and 2B which illustrate a first example of such reinforcing means. In this example, provision is made for the reinforcing means to comprise, on each shell holder 9A, 9B, at least two strips 23A, 23B projecting from the respective two longitudinal edges of the shell holder substantially as a continuation of the shape of the shell holder (just one strip 23A and just one strip 23B can be seen in FIG. 2A). The strips 23A, 23B cover a distance around the periphery that is such that, when the mold is in the closed position shown in FIGS. 2A and 2B, the frontal surfaces of the strips 23A, 23B belonging to the respective shell holders 9A, 9B bear against one another at 28, as do the shells. In the shell-mounting configuration more specifically envisioned in FIGS. 2A and 2B, the strips 23A, 23B are located along the lower edge or in close proximity to the lower edge of the respective shell holders 9A, 9B.

By virtue of this arrangement, when the chamber of the pressure-compensating means 16 is pressurized, the lower part 22A of the shell holder 9A finds itself bearing against the other shell holder 9B and there is therefore no risk of it becoming deformed.

An alternative form of embodiment, illustrated in FIG. 2C, may consist in strengthening the lower part of the shell holders 9A, 9B still further using ribs 24A, 24B respectively, which project radially inwards and extend over the entire perimeter of the shell holders, along the lower edge or in close proximity thereto, even facing the strips 23A, 23B. This then gives the lower parts 22A, 22B of the shell holders 9A, 9B improved rigidity.

The solutions that have just been explained are effective and can be implemented at least under certain mold operating conditions. They do, however, have the disadvantage of requiring a structural modification to the shell holders, and certain operators may find this unacceptable.

To avoid this disadvantage, in a preferred embodiment illustrated in FIGS. 3A and 3B, provision is made for the reinforcing means to be formed of two semi-tubular portions 25A, 25B which are located at those parts 30A, 30B of the shell holders that are left unoccupied by the shorter shells 20A, 20B, in this instance, underneath the shells in the practical example illustrated. The portions 25A, 25B have a height substantially equal to the difference in respective heights of the shell holders 9A, 9B and the shells 20A, 20B, and they have substantially the same external perimeter as the shells so that their respective longitudinal frontal surfaces will bear against one another at 27 as do the shells, when the mold is in the closed position as shown in FIGS. 3A and 3B.

The practical benefit in this solution lies in the fact that the semi-tubular portions 25A, 25B can be obtained from a tube of appropriate diameter and appropriate thickness, with a minimum machining time and with no appreciable loss of material, and they are used in the mold only when shells 20A, 20B which are not as tall as the respective shell holders (9A, 9B) are being used.

Advantageously, the semi-tubular portions 25A, 25B have, passing through their wall, longitudinal bores 26 able to accept components (not shown) that allow them to be fastened, particularly using screws, to the respective shells 20A, 20B. The semi-tubular sections and the respective shells are thus mechanically joined together to constitute one-piece assemblies that are easier to handle for fitting/removal purposes.

The invention claimed is:

1. A molding device for manufacturing containers, particularly bottles, made of thermoplastic, such as PET, by blow-molding or stretch-blow-molding and which are liable to have different heights, said molding device comprising at least one mold which comprises two mold halves able to move relative to one another and a mold base able to move relative to the two mold halves in axial translation, each mold half comprising a mold holder, a shell holder fixed to the mold holder and a shell supported by the shell holder, the two shells and the mold base comprising respective molding cavity portions which, when the mold is in the closed position, together define a molding cavity, means for compensating for the blowing pressure being provided between a mold holder and the respective shell holder, comprising the following combination of features:

to manufacture containers of the tallest height (maximum height), the shell holders and shells have substantially identical respective heights, to manufacture containers of heights shorter than said maximum height, the shells have a height shorter than that of the respective shell holders and reinforcing means are provided on the respective internal faces of the shell holders in those parts thereof that are not cooperating with the respective shells, said reinforcing means being able radially to reinforce those parts of the shell holders that are not cooperating with the respective shells when the pressure-compensating means are active.

2. The molding device as claimed in claim 1, wherein the shells are sported by the respective shell holders in such a way that their respective upper edges are substantially aligned with one another, in that, to manufacture containers of heights shorter than said maximum height, those parts of the shell holders which are not cooperating with the respective shells are the lower parts of the shell holders, and in that the reinforcing means are located in said lower parts of the shell holders.

3. The molding device as claimed in claim 2, wherein the reinforcing means comprise, on each shell holder, at least two strips projecting from the respective longitudinal edges of the shell holder substantially as a continuation of the shape of the shell holder and covering a distance along the perimeter that is such that when the molding is in the closed position, the frontal surfaces of the strips belonging to the respective shell holders bear against one another just as do the shells.

4. The molding device as claimed in claim 3, wherein the strips are located along the lower edge or in close proximity to the lower edge of the respective shell holders.

5. The molding device as claimed in claim 4, wherein the shell holders have respective ribs which project radially inwards and extend around the entire perimeter of the shell holders, along the lower edge or in close proximity to the lower edge thereof, even facing the strips.

6. The molding device as claimed in claim 2, wherein the reinforcing means comprise two semi-tubular portions which are situated under the shells, which have a height substantially equal to the difference in respective heights of the shell holders and shells and which have substantially the same external perimeter as the shells so that the respective longitudinal frontal surfaces of the two portions bear against one another when the mold is in the closed position.

7. The molding device as claimed in claim 6, wherein the semi-tubular portions have, passing through their wall, longitudinal bores capable of accepting components for fastening them, particularly by screwing, to the respective shells.

* * * * *